United States Patent
Licitar

(10) Patent No.: US 9,404,449 B2
(45) Date of Patent: Aug. 2, 2016

(54) APPARATUS FOR TREATING A MIXTURE OF FOSSIL FUEL AND WATER PRIOR TO COMBUSTION IN COMBUSTION ENGINES

(71) Applicant: AUA EHF., Reykjavik (IS)

(72) Inventor: Antonijo Licitar, Rijeka (HR)

(73) Assignee: NOX—Reducts Technology SA, Luxembourg (LU)

( * ) Notice: Subject to any disclaimer, the term of this patent is extended or adjusted under 35 U.S.C. 154(b) by 83 days.

(21) Appl. No.: 14/360,671

(22) PCT Filed: Nov. 22, 2012

(86) PCT No.: PCT/EP2012/004840
§ 371 (c)(1),
(2) Date: May 27, 2014

(87) PCT Pub. No.: WO2013/075832
PCT Pub. Date: May 30, 2013

(65) Prior Publication Data
US 2015/0300299 A1    Oct. 22, 2015

(30) Foreign Application Priority Data
Nov. 25, 2011 (IS) .......................................... 050022

(51) Int. Cl.
| | |
|---|---|
| *F02G 5/00* | (2006.01) |
| *F02M 27/04* | (2006.01) |
| *F02M 25/022* | (2006.01) |
| *F23K 5/08* | (2006.01) |
| *F23C 99/00* | (2006.01) |
| *F02B 1/04* | (2006.01) |
| *F02B 3/06* | (2006.01) |
| *F02M 31/18* | (2006.01) |
| *F02M 27/02* | (2006.01) |

(52) U.S. Cl.
CPC ........... *F02M 27/04* (2013.01); *F02M 25/0224* (2013.01); *F02M 25/0228* (2013.01); *F02M 27/045* (2013.01); *F23C 99/001* (2013.01); *F23K 5/08* (2013.01); *F02B 1/04* (2013.01); *F02B 3/06* (2013.01); *F02B 2275/14* (2013.01);
(Continued)

(58) Field of Classification Search
CPC ..... F02M 27/045; F02M 27/02; F02M 27/04; F02B 3/06; F02B 1/04
USPC ........................................................ 123/538
See application file for complete search history.

(56) References Cited

U.S. PATENT DOCUMENTS

| 4,073,273 A | 2/1978 | McMahon |
| 4,355,969 A | 10/1982 | Nelson et al. |

(Continued)

FOREIGN PATENT DOCUMENTS

WO    WO 2005116431 A1 * 12/2005 ............ F01N 3/0814

*Primary Examiner* — Lindsay Low
*Assistant Examiner* — Charles Brauch
(74) *Attorney, Agent, or Firm* — Richard M. Goldberg

(57) ABSTRACT

An apparatus for treating a mixture of fossil fuel and water includes a treatment unit for treating the mixture and including an inlet for the mixture, an outlet for discharging a treated mixture of fossil fuel and water, and an assembly of tubes of a non-magnetic material, the tubes having a circular cross-section, and the assembly arranged between the inlet and the outlet, the tubes have different diameters, have substantially equal lengths, are arranged in length alignment, and are arranged concentrically with the tubes defining intermediary spaces, thus providing flow paths for the mixture between the inlet to the outlet, an innermost and outermost tube being electrically connected to an electrical current generator, for supplying a pulsed current with the innermost tube connected to a positive pole and the outermost tube connected to a negative pole to expose the mixture flowing through the intermediary spaces to an electromagnetic field.

14 Claims, 5 Drawing Sheets

(52) U.S. Cl.
CPC ................ *F02M 27/02* (2013.01); *F02M 31/18* (2013.01); *Y02T 10/121* (2013.01)

(56) References Cited

U.S. PATENT DOCUMENTS

| | | | |
|---|---|---|---|
| 5,156,114 A | 10/1992 | Gunnerman | |
| 5,320,726 A | 6/1994 | Iwata | |
| 5,377,648 A * | 1/1995 | Iwata | F02M 27/04 123/25 R |
| 5,620,570 A | 4/1997 | Iwata | |
| 2003/0010214 A1* | 1/2003 | Naruke | B01D 53/92 96/337 |
| 2007/0141370 A1* | 6/2007 | Kerber | B82Y 30/00 428/469 |

\* cited by examiner

APPARATUS FOR TREATING A MIXTURE OF FOSSIL FUEL AND WATER PRIOR TO COMBUSTION IN COMBUSTION ENGINES

FIELD OF INVENTION

The present invention relates to a device for providing fossil fuels comprising amounts of water for combustion engines in cars, trucks, and ships or some other working or power plant engine use as well as boilers, burners, gas turbines and other devices which use fossil fuel.

BACKGROUND OF THE INVENTION

Several publications disclose blending of water and fossil fuel, such as diesel. U.S. Pat. No. 5,156,114 describes a method comprising introducing air and aqueous fuel into a fuel introduction system for the engine. The fuel comprises water from about 20 percent to about 80 percent by volume of the total volume of the fuel, and a carbonaceous fuel from ethanol, methanol, gasoline, kerosene fuel, diesel fuel, carbon-containing gaseous or liquid fuel, or mixtures thereof, and introducing and combusting said air/fuel mixture in a combustion chamber or chambers in the presence of a hydrogen producing catalyst to operate the engine.

Common problems associated with blending water with fossil fuel involve for example separation of mixture after mixing as the density of the two components is different. Another problem of mixing water and fossil fuel is the large dimension of water particles in emulsified fuel resulting in the bigger water particles consuming thermal energy for evaporating water. Attempts have been made with injecting pure oxygen together with the fuel, which has caused damaging of fuel injectors, fuel pump and even damaging of engine. Other problems are condensation of water in the cylinder space after running and present water particles in crank case oil, decreased flammable point of fuel, increasing of density of blended fuel, increasing of pressure in fuel delivery system and lubrication of fuel delivery system. These are just some of the problems relating to the quality of the mixture and to the introduction/injection into the engine.

SUMMARY OF THE INVENTION

On this background, it is an object of the present application to provide an apparatus having improved mixing capabilities for improved mixing of fuel and water.

This object is achieved by providing an apparatus for treating a mixture of fossil fuel and water for use in internal combustion engines, boilers, heating units, gas turbines or any other fossil fuel burning machine, the apparatus comprising a treatment unit, for treating the mixture of fossil fuel and water. The treatment unit comprises an inlet for receiving the mixture of fossil fuel and water into the treatment unit and an outlet for discharging a treated mixture of fossil fuel and water from the treatment unit, and an assembly of two or more tubes of a non-magnetic material, the two or more tubes have a circular cross-section, and the assembly being arranged between the inlet and the outlet. The two or more tubes have different diameters, have substantially equal lengths, are arranged in length alignment, and are arranged concentrically with the tubes defining a plurality of intermediary spaces, thus providing flow paths for the mixture of fossil fuel and water between the inlet and the outlet. Furthermore, an innermost tube and an outermost tube are electrically connected to an electrical current generator, and the electrical current generator is configured for supplying a pulsed current with the innermost tube being connected to a positive pole of the electrical current generator and the outermost tube being connected to a negative pole of the electrical current generator to thereby expose the mixture of fossil fuel and water flowing through the intermediate spaces to an electromagnetic field. Charging and discharging of ions in the fuel and water molecules may also occur during application of the pulsed electrical current from, and at the same time partly oxidation of the fuel molecules with oxygen from the water thereby splitting fuel molecule chains into smaller sections comprising added hydrogen on some or all of the released carbon bonds or carbon ends in the fuel molecule chain.

Tubes are referred to in the present context as any hollow structure having a longitudinal extension and a substantially circular cross-section such as a tube, pipe or cylinder.

In an embodiment the treatment unit further comprises a distribution chamber connected to the inlet for distributing the flow of the mixture of fossil fuel and water between the intermediary spaces. Also, the treatment unit comprises a collecting chamber connected to the outlet for collecting the flow of the treated mixture of fossil fuel and water from the intermediary spaces, and a tank comprising a mixture of fossil fuel and water, a first conduit connecting the tank to the inlet of the treatment unit, a second conduit connecting the outlet of the treatment unit to the tank.

In an embodiment the treatment unit further comprises a surface on an inside of the outermost tube of the device being coated with metal particles, and furthermore the outermost tube is insulated from the adjacent tube with an electrically insulating material. Also, two or more permanent magnets in pole orientation south to south are arranged in an end of the tubes closest to the inlet of the mixture of fuel and water, and the permanent magnets arranged on two opposite sides of the tubes with the south pole orientation of the permanent magnets facing the tubes, and finally a surface on an outside of at least one of the inner tubes comprising activated carbon.

In an embodiment the hydrogen and oxygen containing liquid to be mixed with the fuel contains at least 80-100% of hydrogen and oxygen.

In an embodiment the mixed fuel and water contains at least 5-95% fossil fuel.

In an embodiment the mixed fuel and water contains at least 50-95% fossil fuel.

In an embodiment the treatment unit is made from tubes of stainless steel.

In an embodiment the treatment unit is made from tubes of an electrically conductive non-magnetic material.

In an embodiment the treatment unit further comprises a treatment material arranged in the intermediary space in between the tubes.

In an embodiment the treatment material in the treatment chamber is thin wire of natural silk.

In an embodiment the treatment material in the treatment chamber is another material having properties similar to those of silk.

In an embodiment of the invention filling of the treatment unit is controlled with a mixture control valve.

In an embodiment the treatment unit comprises metal particles selected from but not limited to the group of, Al, Si, Zn, FeO and CuO.

In an embodiment a fuel processor unit is part of the treatment unit.

In an embodiment, the fuel processor unit forms the innermost intermediary space of the treatment unit.

In an embodiment the metal particles in the treatment unit are grounded to release charge. A specialized discharge system may be used comprising two circuits charging and discharging separately with different timing, such that charging and discharging of the two circuits is not performed in time but desynchronized such that one circuit is charging while the other circuit is discharging.

Also, the invention relates to a method of providing a treated mixture of fossil fuel and water to internal combustion engines, burners, heating units or gas turbines by application of an apparatus comprising a treatment unit according to the invention.

Furthermore, the invention relates to a combustible treated mixture of fuel and water obtained by the method of providing a treated mixture of fossil fuel and water to internal combustion engines, burners, heating units or gas turbines by application of an apparatus comprising a treatment unit according to the invention.

In an embodiment of the invention the apparatus furthermore comprises a fossil fuel burning machine. Also, a third conduit fluidly connecting the tank to the fossil fuel burning machine and a fourth conduit connecting from the fossil fuel burning machine to the tank.

In an embodiment of the invention the apparatus furthermore comprises a fuel cell.

In an embodiment of the invention the apparatus furthermore comprises a plurality of inline pumps for distribution of fuel and water in the apparatus.

The present invention provides a novel method and apparatus of blending water and fuel together. The problem of mixing water and fossil fuel is that these are two very different liquids such as liquids with a difference in density around 30%. The solution provided by the present invention is to blend these two liquids together using a treatment unit according to the present invention, in order to obtain a useful combustible fluid and without losing part of thermal energy in evaporation of water e.g. in a cylinder of a combustion. The apparatus presented in the present invention discloses a treatment unit wherein a mixture of fuel and water is subjected to a pulsed electrical current leading to a charging and discharging of the ions in the molecules present inside the apparatus. The treatment unit is made from two or more tubes of different diameter, placed around each other so that the smallest tube is the innermost tube and the tube with the broadest diameter is the outermost tube. The innermost and outermost tubes are connected to an electrical pulse generator which generates a pulsed electrical current. The surface of adjacent tubes may be separated by thin wire net of material such as natural silk. Other materials appropriate for good dispersing of fluid particles between the pipes may advantageously be used to separate the water into smaller particles. One scenario may be that the H molecules lose one ion in the treatment unit and it is therefore overcharged, but the $O_2$ will facilitate the burning reaction as an $O_2$ catalyst in the combustion chamber and may case carbon by partial oxidation of the carbon in the fuel molecule chains, leading to improved conditions of blending fuel and water. The ends of the tubes may be supplied with two or more permanent magnets in the pole orientation south to south between each other. The magnetic field supplied by such magnets may lead to improved conditions of blending fuel and water, and the magnetic field may be provided by permanent magnets or electromagnets. The inside of the outermost tube is coated with metal particles such as aluminum. When the fuel molecules pass through the treatment unit one scenario may be that the positive electrostatic charge of H molecules are decreased in the fossil fuel chain which may be caused by negatively charged aluminum particles present on the surface of the tubes. The water and the fuel are either blended in a separate tank or in the treatment unit. The treatment unit may further comprise an inner tube which comprises activated carbon. Overcharged fuel molecules in the treatment unit appear where one ion from one of the H molecules is removed. The treated mixture of fossil fuel and water from the treatment unit is then directed again into the treatment unit for complete cracking of carbon molecules in the fuel. The present invention allows production of blended fuel which can be used in most kind of diesel engines or burners, because water particles are reduced therefore not resulting in a substantial decrease of the flammable point of the fuel.

In an aspect of the invention the apparatus comprises three different units and then conduit to connect them. Firstly, a first unit is provided for treatment of $H_2O$. This unit comprises two or more tubes of different diameter, wherein the tube with smaller diameter is placed within the tube with the larger diameter. The innermost tube and outermost tube are connected to a pulse generator which is capable of generating a pulsed electromagnetic field. A modulated pulse current from the collapsed electromagnetic field may be a consequence of the pulsed electromagnetic field. Also, an intermediary space in between the tubes may contain a separation material such as silk. Secondly second unit may be provided to prepare the fossil fuel before blending with water. The unit may further comprise two or more tubes, made from non-magnetic material such as stainless steel, where the surface on the inside of the most outer tube is coated with metal particles. The outermost tube is insulated from the adjacent next tube with insulation material, such as ceramic. Two of tubes may be connected to a power supply delivering a pulsed charge by one or more inductive coils generating a pulsed magnetic field and thereby a pulsed collapse of the magnetic field. Furthermore, the tubes are supplied at one end of the tubes with two or more permanent magnets preferably very strong magnets such as Fe—Nd—B magnets for application of magnetic fields above 0.1 Tesla inside the tubes. The permanent magnets are arranged with a pole orientation south to south towards each other. The innermost tube may furthermore comprise activated carbon. The third unit may be a blender unit for blending the treated water and the treated fuel together and to keep the blended solution in circulation storage such that the treated mixture of fuel and water is ready for use. The blender may comprise one or more tubes, inlets for water and for fuel, openings for the treated gas and the treated fuel to ensure proper mixing, and an outlet leading to the combustion engine.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF THE INVENTION

Figure 1:
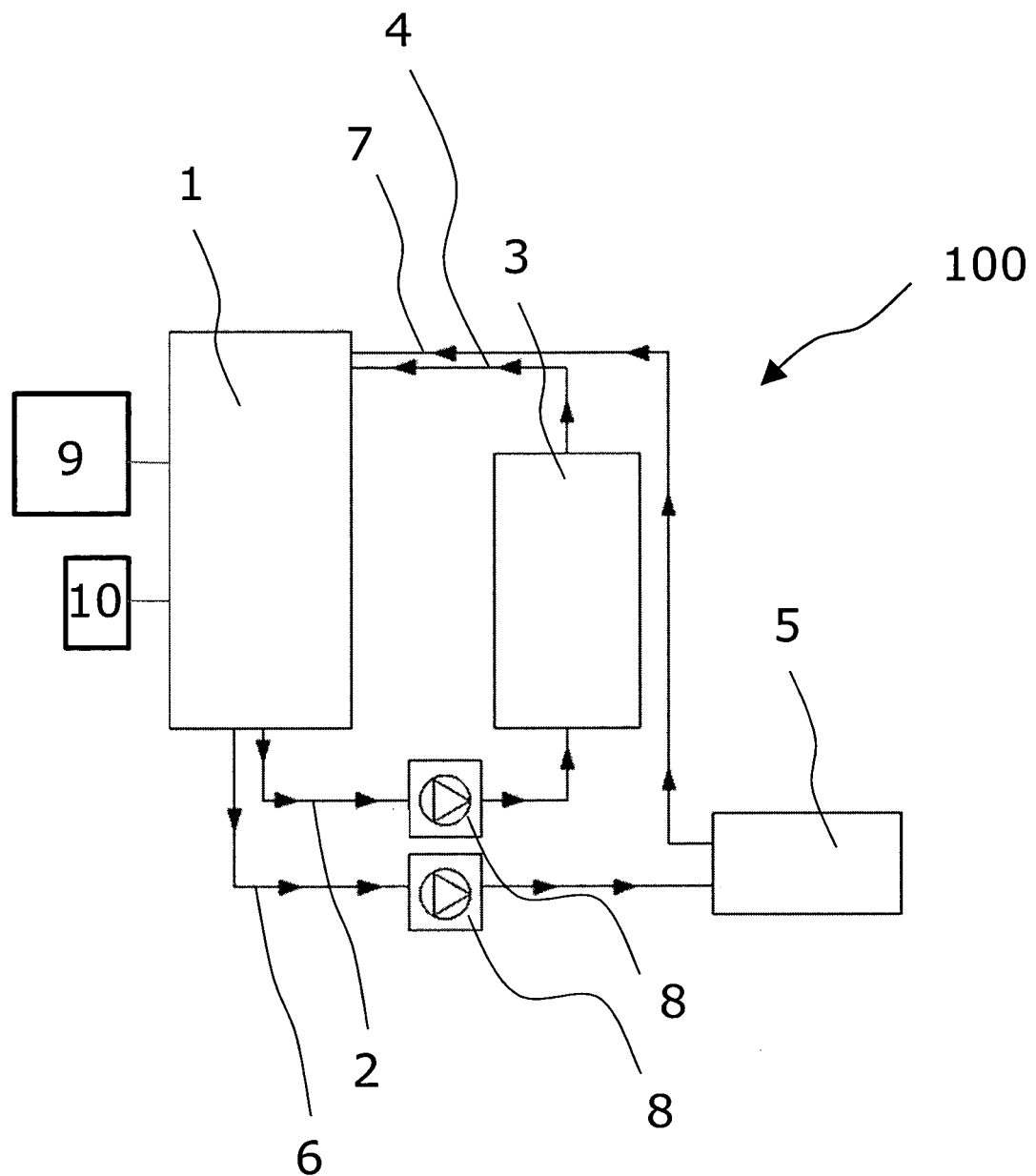
FIG. 1 is a schematic view a system comprising an apparatus according to an example embodiment of the invention.

The following embodiments and definitions relate to the device and the method of the present invention.

In the present context the device and the method are applicable for devices that use fossil fuel such as, but not limited to combustion engines, boilers, burners and gas turbines.

In the present context the term fuel processor refers to a unit for preparing fossil fuel molecules such that they will better blend with water by overcharging the fuel molecules and giving them a uniform orientation.

In the present context the term blender unit refers to a unit for mixing treated water and treated fuel in a magnetic field.

In an embodiment of the present invention the water treatment unit is made from stainless steel tubes.

In an embodiment of the present invention the separation material in the water treatment unit is made from thin wire of natural silk to provide smaller particles of water to the surface of the tube.

In an embodiment of the present invention the filling of the treatment unit is controlled with a mixture control valve.

In an embodiment of the present invention the filling of the fuel may be provided with separate controlled dozing unit for both fuel and water controlled with a central control unit ensuring that there is always enough fuel and water available for a given power output needed. The power output needed is input in the central control unit.

In an embodiment of the present invention the metal particles are isolated from the inner tubes with good insulation and the aluminum is grounded to release charge.

In an embodiment of the present invention two of the tubes are connected to a power supply with pulsed charge from collapsed inductive coil.

In an embodiment of the present invention an electrical power supply may supply a pulsed charge providing conditioning of fuel having frequencies between 100 and 250 kHz, such as 146 kHz of pulsing electrical current generated in resonance with the water.

In an embodiment of the invention the apparatus furthermore comprises a blender made from copper or stainless steel tube and the blender being filled with activated carbon. The blender may be a separate unit or arranged as a part of the treatment unit, i.e. the innermost tube of the unit. Such a combined treatment unit may comprise a blender and further a fuel processor is used for preparing the fuel or hydrocarbon molecules for better ionic exchange by charging the chamber with positive pole of pulse generator and the other pole is connected to the middle tube of the blender. The outer tube is insulated from inner tubes with a good electrical insulator such as a ceramic material and the space in between this insulator and outer tube is filled with iron or aluminum particles. This part of the tube is charged with negative charges by the pulse generator.

It is sufficient for the electric current generator to provide a relatively weak output power typically below 50 W. The electric current generator may therefore be powered by a standard generator in a car.

In an embodiment of the present invention the inside of the outermost tube of the fuel processor unit is coated with metal particles such as, but not limited to Al, Si, Zn, FeO and CuO. The particles have the purpose of increasing the surface of the tube and discharge part of the ion on the molecules.

FIG. 1 is an overview of the system of the present invention showing how the device and the method work together in blending water and fossil fuel for combustion engines. The figure shows a tank 1 for storage of mixed fuel and water and illustrates a first conduit 2 where the mixed fuel and water is guided into a treatment unit 3, where the mixed fuel and water is treated by exposure to an electromagnetic field. The treated fuel and water mixture is then passed back to the tank 1 from the treatment unit 3 through a second conduit 4.

Additional fossil fuel may be fed from a fuel tank 9 to the tank 1 and additional water may be fed from a water tank 10 to the tank 1. Also further preconditioning of the fuel may be performed by the positive electrostatic charge of molecules H in chain of fuel molecules being decreased to bring the fuel to the same resonance frequency as the water or another hydrogen oxygen containing liquid such as hydrogen peroxide or a mixture of gaseous hydrogen and oxygen in order to obtain improved blending capabilities of both water and fuel in the treatment unit 3. The charged fuel is then passed into the treatment unit, where the liquid mixture of hydrogen and oxygen and the overcharged fuel blend together and can be injected there from into the combustion engine 5. Overflow gas may also be passed through the third 6 and fourth 7 conduits for mixing with more water and fuel for complete burning in the engine 5.

Preconditioning of the water may be performed in a separate water treatment unit made from stainless steel tubes of different diameter inserted in each other with thin layer of material between them. The thin material may be a wire net of natural silk, which distributes the water over the whole area between the surface of two tubes to separate the water into smaller particles and to give the water more surface area within the chamber. The innermost and outermost the last tubes are connected to a pulse generator which generates modulated pulses of current stemming from collapsed electromagnetic fields. The innermost tube may be charged with a positive charge and the outermost tube with a negative charge. The structure of several tubes with different diameter arranged in this manner within one another and separated by material to distribute the water to be treated can be compared to a capacitor made from different dimensioned cylindrical plates, where the plates are never able to make same quantity of electrical charge on their surface. The inner surface of the larger tube is negatively charged as the outer surface of the next smaller tube is positively charged. Due to this arrangement, part of this charging and discharging between the surfaces starts to simulate resonance in the water and fuel molecules. The effect may be a splitting of the bonds between the molecules of hydrogen and oxygen and/or splitting the chains of fuel molecules. The last innermost and outermost tubes are connected to a pulse generator which generates modulated pulses of current thereby providing a condition for collapsed electromagnetic fields and modulated pulses of electrical current.

Preconditioning of the fuel before blending with oxygen and hydrogen molecules may be performed in a separate fuel treatment unit. In an embodiment the fuel treatment unit may be made from two or more tubes inside each other made from non-magnetic material, such as stainless steel, and where a surface of the outermost tube is coated with aluminum particles of a few millimeters in diameter or some other material facilitating ionic exchange. The aluminum particles are insulated from the surface of the adjacent tube with insulations such as the ceramic layer. The aluminum may be grounded to release charge. Two of the tubes are connected to power supply for supplying a pulsed charge stemming from collapsed magnetic fields in the tubes functioning as inductive coils. Also at both ends of the tubes in the fuel treatment unit powerful magnets may be arranged on each side of the fuel treatment unit in the pole orientation south to south. The magnets may orient the magnetic spin of the fuel molecules due to the applied outer magnetic field from the permanent magnets. The permanent or electromagnetic field and the pulsed electromagnetic field in conjunction will affect the stability of the fuel molecules chain, so when they pass by the carbon particles one or more of the hydrogen electrons in the fuel molecules may be discharged.

Figure 2:
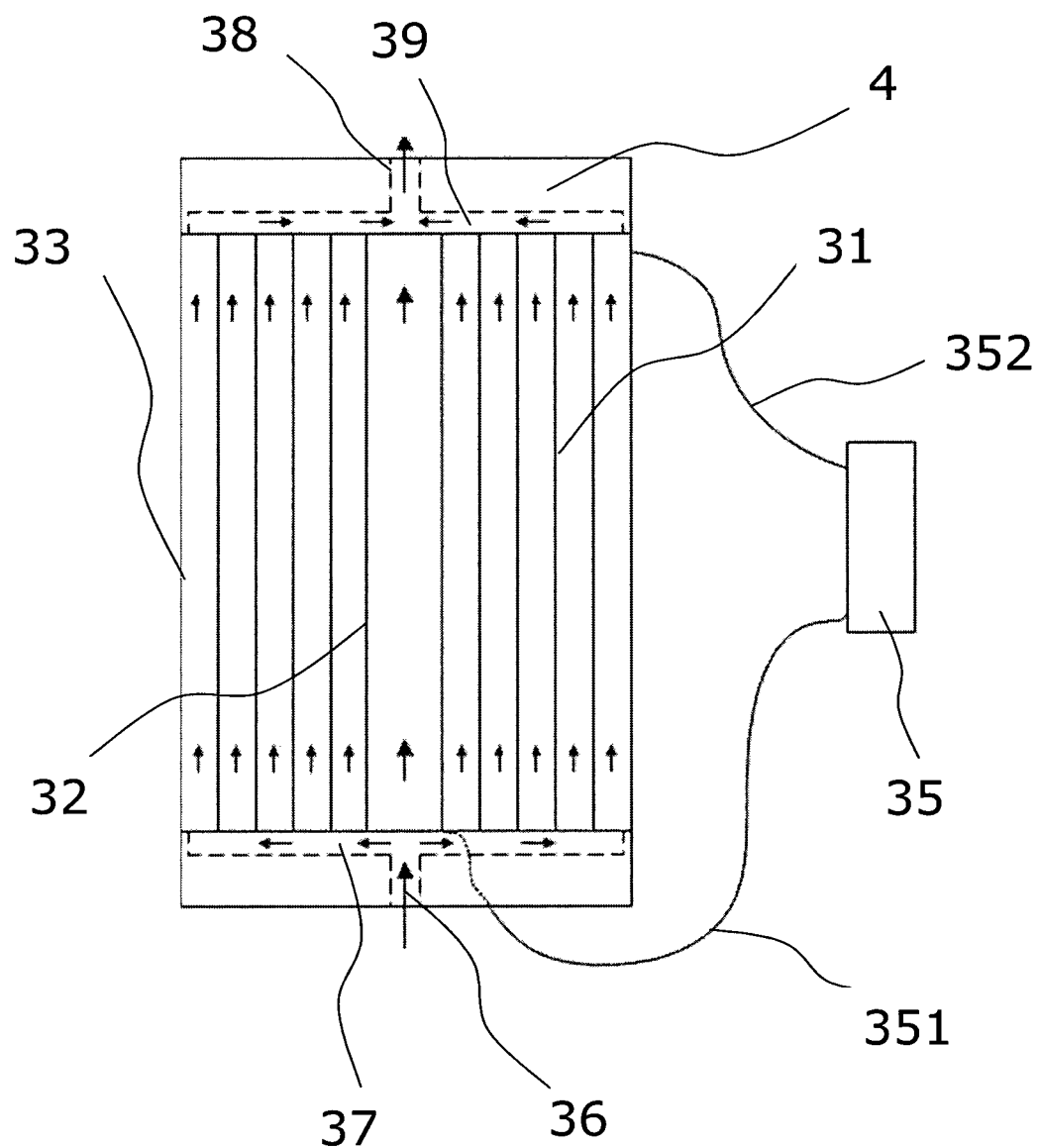
FIG. 2, is a sectional view of a treatment unit according to an example embodiment of the invention.

FIG. 2 shows a schematic drawing of an example embodiment of the treatment unit 3, which serves the purpose of treating the fossil fuel and water such that they are improving their mixing capabilities and to keep the treated mixture in circulation storage prepared for use. The treatment unit 3 comprises two or more circular cross-sectional tubes 31 of different diameter and of substantially equal length arranged in length alignment and arranged concentrically, wherein the tube with the smallest diameter is arranged innermost within the tubes having larger diameters and wherein the tube with the largest diameter is arranged outermost surrounding the tubes having smaller diameters, the tubes defining a plurality of intermediary spaces between the tubes. An innermost tube 32 and an outermost tube 33 define a space between the innermost tube and the outermost tube for receiving the mixture of fossil fuel and water. Also the innermost tube and the outermost tube are electrically connected to an electrical current generator 35 capable of supplying a pulsed electromagnetic field to the mixture of fossil fuel and water being present in the space between the innermost and outermost tube since the innermost tube is connected to a positive pole 351 of electrical current generator 35 and the outermost tube is connected to a negative pole 352 of electrical current generator 35. Also the treatment unit 3 comprises an inlet 36 for letting the mixture of fossil fuel and water into the treatment unit and a distribution chamber 37 for distributing the flow of the mixture of fossil fuel and water between the intermediary spaces. To ensure a good distribution of the mixed fuel and water in the treatment unit 3 the distribution chamber ensures optimal distribution in the plurality of intermediary spaces between the plurality of tubes 31. At the other end of the plurality of tubes the treatment unit is equipped with an outlet 38 for letting a treated mixture of fossil fuel and water out from the treatment unit and a collecting chamber 39 for collecting the flow of the treated mixture of fossil fuel and water from the intermediary spaces.

Figure 3:
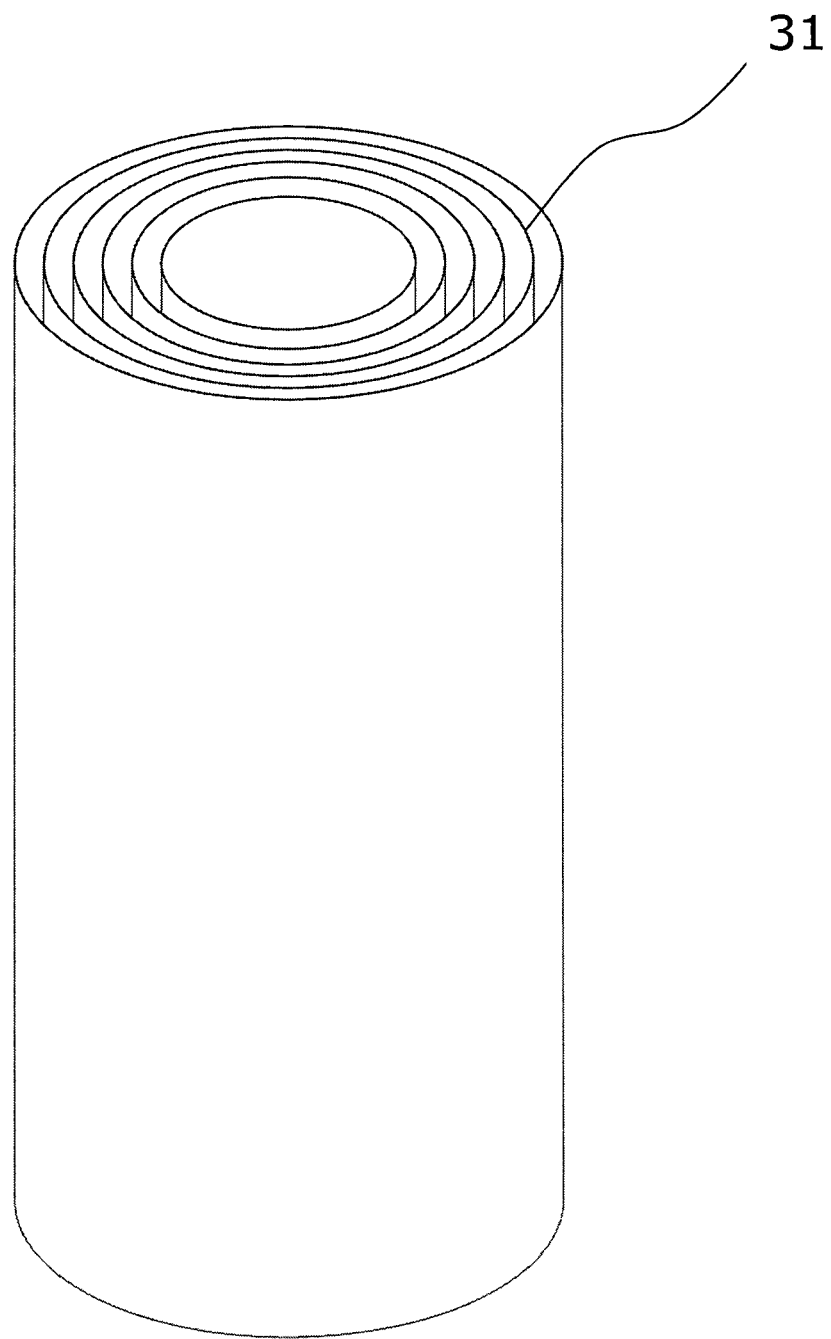
FIG. 3 is a perspective view of an assembly of tubes of a treatment unit according to an example embodiment of the invention.

FIG. 3 shows an assembly of six tubes 31 having a circular cross-section. The six tubes 31 have different diameters and substantially equal lengths. Furthermore, it is shown in FIG. 3, that the tubes are arranged in length alignment, and are arranged concentrically with said tubes defining a plurality of intermediary spaces, thus providing flow paths for the mixture of fossil fuel and water between the tubes. The perspective view of the assembly in FIG. 3 is not truly three-dimensional, but for the purpose of explaining the assembly of tubes 31 this perspective view is sufficient.

In another embodiment of the invention a hydrogen oxygen gas enters the treatment unit through an isolated tube and fills a specific chamber of the treatment unit. This chamber is advantageously the space between the largest and second largest tubes in the treatment unit and preferably contains metal particles such as Aluminum or Iron particles. Also this chamber should be separated from inner tubes with an insulation tube e.g. made from textolite or ceramic material. The innermost tube may contain activated carbon.

The inside of the outermost tube may comprise metal particles such as Fe or Al particles to participate in the ion-exchange of the water and the fuel as it enters this tube. Permanent magnets or electromagnets may furthermore be arranged at one end of the treatment unit to provide an oriented magnetic field to provide the molecules in the treatment unit with the same magnetic spin orientation. The inside of the outermost tube may also comprise non-metal particles.

Figure 4:
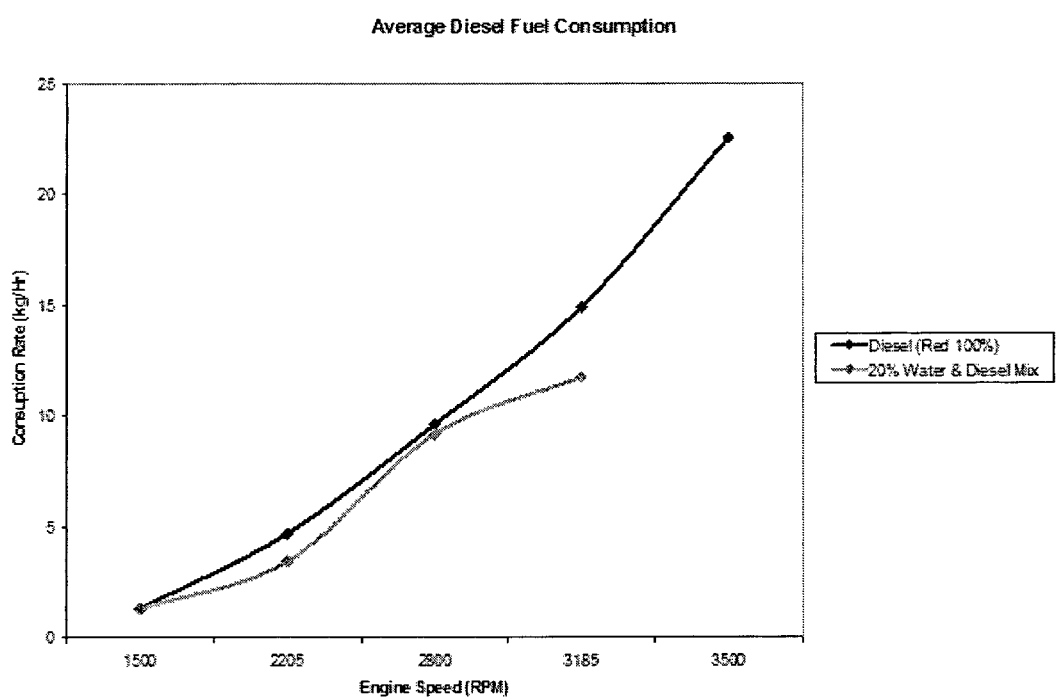
FIG. 4 is a graph of diesel fuel consumption perspective as function of engine speeds.

Laboratory tests have shown that treating the mixed fuel and water using the above described apparatus may lead to significant reductions in fuel consumption. As shown in the graph of FIG. 4 diesel fuel consumption was lowered significantly using a 20/80% mixture of water/diesel after treating the water diesel mixture with a treatment unit according to the present invention. The tests were performed in an accredited UK laboratory Revolve Technologies LTD using a Ford 1.6 L DV6 115PS (4-cylinder, VGT turbo, diesel) engine at 5 different engine speeds. The DV6 14 engine was fitted to a dynamometer without exhaust after treatment equipment (i.e. DOC, EGR, DPF & LNT) but with a BORGHI & SAVERI FE300S dynamometer and the test fuel was RED Diesel (45 Cetane). As shown in FIG. 4 five test points at different engine speeds were tested and there was a clear reduction in the diesel consumption. The fifth test point at engine speed 3500 rpm was not possible to complete due to insufficient output of treated fuel and water mixture in the tested setup. However, larger dimensions of the treatment unit or alternatively several treatment units in combination would provide sufficient amounts of treated diesel and water mixture. Test Point 1 (1500 rpm 30.0 Nm): At this low speed and minimal load condition a small reduction of diesel fuel consumption was observed totaling 0.89%. The total mass of fluid injected into the engine to produce the same torque had increased from 1.32 Kg/h to 1.64 kg/h. Test Point 2 (2205 rpm 68.1 Nm): At this engine and load condition the benefits of the treatment unit became evident. Both the total mass of injected fluid and diesel consumed had been reduced but the torque output from the engine had been maintained. The mass of fluid injected dropped from 4.69 Kg/h to 4.29 Kg/h which was a reduction of 8.5%. As the total mass of fluid consumed was lower this resulted in a greater reduction of diesel fuel consumption. The total amount of fossil fuel needed to produce the required torque output of 68.1 Nm, had fallen from 4.69 Kg/h (100% diesel) to an average of 3.43 Kg/h (diesel 80%). This equates to a diesel fuel saving of 26.7% throughout the tests performed. Test Point 3: (2800 rpm 136.3 Nm): Once again the total mass delivered to the engine has increased, from 9.63 Kg/h to 11.47 Kg/h. A reduction in diesel fuel was observed though out the majority of tests conducted. The average required amount of fuel to produce 136.3 Nm of torque dropped from 9.63 Kg/h (diesel 100%) to 9.18 Kg/h (diesel 80%); therefore giving an observed reduction in fuel used of 4.6%. Test Point 4 (3185 rpm, 195.9 Nm): A limited number of individual tests were completed at this engine condition due to insufficient fuel delivery and power loss observed, which got worse as the test schedule was completed. Even with the limited testing it was still clear to see a significant reduction of fossil fuel consumed over the normal fuel delivery system. The observed reduction of diesel consumption was 21.1%, due to the consumption rate falling to 11.75 Kg/h.

Figure 5:
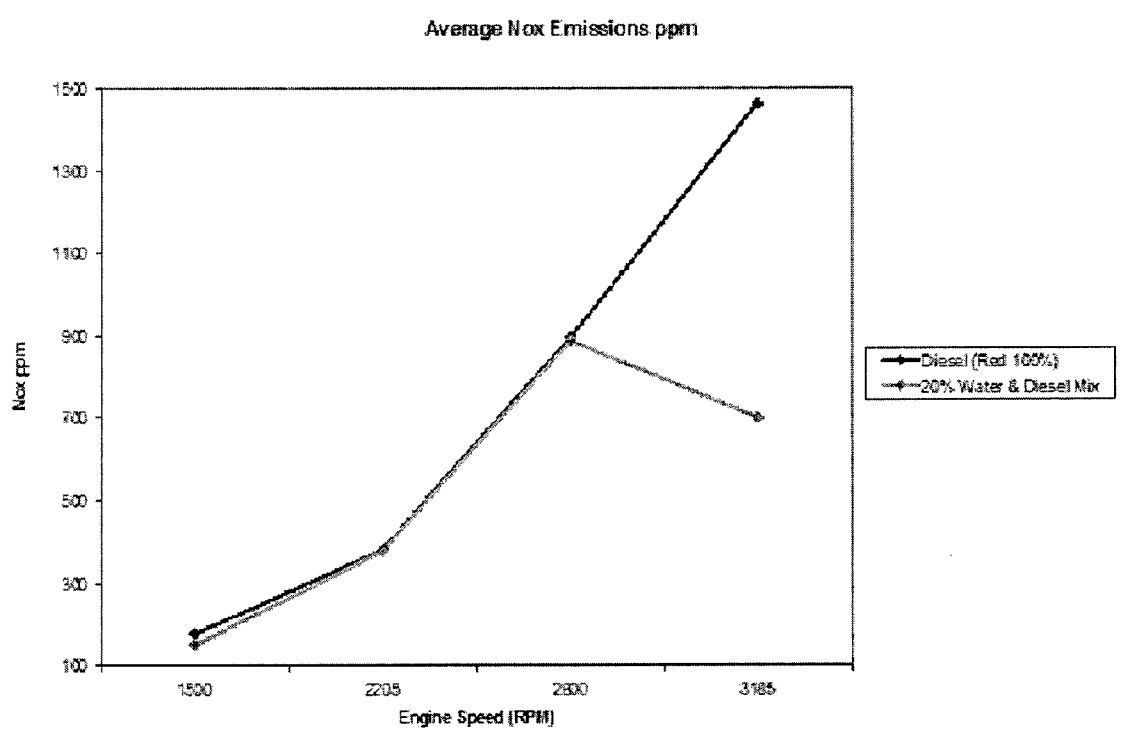
FIG. 5 is a graph of NOx emission as function of engine speeds.

Furthermore, the emissions from the engine were monitored, and it seems that at every test point on every one of the individual tests completed a reduction in NOx emissions is evident as shown in the graph of FIG. 5. At Higher Speed/Loads this reduction was near the magnitude of 60%. The overall reduction in NOx tailpipe emissions varied from 0.58% to an impressive 52.18% under high load conditions. The majority of the NOx reduction is presumed to be due to a lower combustion temperature resulting from adding water to the fuel.

The tube assembly of two or more tubes 31 arranged between the inlet 36 and the outlet 38 comprises two or more tubes 31 with different diameters and the tubes have substantially equal lengths. The tubes are arranged in length alignment such that they superimpose in the longitudinal direction, i.e. the tubes are opposite each other in the longitudinal direction of the tubes. Furthermore, the tubes 31 are arranged concentrically thereby defining a plurality of intermediary spaces. The innermost tube is the tube having the smallest diameter. Surrounding the innermost tube is the tube having the second smallest diameter. The difference between the diameter of smallest and second smallest tube must be sufficiently large to provide an intermediary space between the smallest and second smallest tube when arranged concentrically in the treatment unit 3 thus providing a flow path for the mixture of fossil fuel and water between the smallest and second smallest tube. Likewise the tube having the second smallest diameter and the tube having the third smallest diameter must have a difference sufficiently large to provide an intermediary space between the second smallest and third smallest tube when arranged concentrically in the treatment unit 3 and the same applies mutatis mutandis to the rest of the tubes in the treatment unit.

The term "comprising" as used in the claims does not exclude other elements or steps. The term "a" or "an" as used in the claims does not exclude a plurality. The single processor, device or other unit may fulfill the functions of several means recited in the claims.

The reference signs used in the claims shall not be construed as limiting the scope.

Although the present invention has been described in detail for purpose of illustration, it is understood that such detail is solely for that purpose, and variations can be made therein by those skilled in the art without departing from the scope of the invention.

What is claimed is:

1. An apparatus for treating a mixture of fossil fuel and water for use in internal combustion engines, boilers, heating units, gas turbines or any other fossil fuel burning machine, and fuel cells, said apparatus comprising a treatment unit for treating said mixture of fossil fuel and water, said treatment unit comprising:
    an inlet for receiving said mixture of fossil fuel and water into the treatment unit,
    an outlet for discharging a treated mixture of fossil fuel and water from the treatment unit, and
    an assembly of at least two tubes of an electrically conductive, non-magnetic material, said at least two tubes having a circular cross-section, and said assembly being arranged between said inlet and said outlet,
    said at least two tubes have different diameters, have substantially equal lengths, are arranged in length alignment, and are arranged concentrically with said tubes defining a plurality of intermediary spaces, thus providing a plurality of flow paths for said mixture of fossil fuel and water between said inlet to said outlet,
    an innermost one of said tubes and an outermost one of said tubes adapted to being electrically connected to an electrical current generator, said electrical current generator being configured for supplying a DC pulsed current with the innermost tube being connected to a positive pole of said electrical current generator and the outermost tube being connected to a negative pole of said electrical current generator to thereby expose said mixture of fossil fuel and water flowing through said intermediary spaces to an electromagnetic field.

2. The apparatus according to claim 1, wherein said treatment unit further comprises:
    a distribution chamber connected to said inlet for distributing the flow of the mixture of fossil fuel and water between the intermediary spaces,
    a collecting chamber connected to said outlet for collecting the flow of the treated mixture of fossil fuel and water from the intermediary spaces,
    a tank comprising a mixture of fossil fuel and water,
    a first conduit connecting said tank to the inlet of the treatment unit, and
    a second conduit connecting the outlet of the treatment unit to said tank.

3. An apparatus for treating a mixture of fossil fuel and water for use in internal combustion engines, boilers, heating units, gas turbines or any other fossil fuel burning machine, and fuel cells, said apparatus comprising a treatment unit for treating said mixture of fossil fuel and water, said treatment unit comprising:
    an inlet for receiving said mixture of fossil fuel and water into the treatment unit,
    an outlet for discharging a treated mixture of fossil fuel and water from the treatment unit, and
    an assembly of at least two tubes of a non-magnetic material, said at least two tubes having a circular cross-section, and said assembly being arranged between said inlet and said outlet,
    said at least two tubes have different diameters, have substantially equal lengths, are arranged in length alignment, and are arranged concentrically with said tubes defining a plurality of intermediary spaces, thus providing a plurality of flow paths for said mixture of fossil fuel and water between said inlet to said outlet,
    an innermost one of said tubes and an outermost one of said tubes adapted to being electrically connected to an electrical current generator, said electrical current generator being configured for supplying a pulsed current with the innermost tube being connected to a positive pole of said electrical current generator and the outermost tube being connected to a negative pole of said electrical current generator to thereby expose said mixture of fossil fuel and water flowing through said intermediary spaces to an electromagnetic field,
    an inside surface of the outermost tube of the treatment unit being coated with metal particles,
    the outermost tube being insulated from a said tube adjacent thereto with an electrically insulating material,
    at least two permanent magnets in pole orientation south to south arranged in an end of the tubes closest to the inlet of the mixture of fuel and water, and the permanent magnets arranged on two opposite sides of the tubes with the south pole orientation of the permanent magnets facing the tubes, and
    a surface on an outside of at least one of the inner tubes comprising activated carbon.

4. The apparatus according to claim 1, wherein the treatment unit is made from tubes of stainless steel.

5. The apparatus according to claim 1, wherein the treatment unit further comprises a treatment material arranged in the intermediary spaces in between the tubes.

6. The apparatus according to claim 5, wherein the treatment material in the treatment chamber is thin wire of natural silk.

7. The apparatus according to claim 1, wherein the treatment unit furthermore comprises a mixture control valve.

8. The apparatus according to claim 3, wherein the metal particles in the treatment unit are selected from the group consisting of Al, Si, Zn, FeO and CuO.

9. The apparatus according to claim 3, wherein the metal particles in the treatment unit are grounded to release charge.

10. The apparatus according to claim 1, wherein the treatment unit furthermore comprises a fuel processor unit in an innermost one of the intermediary spaces of the treatment unit.

11. A method of providing a treated mixture of fossil fuel and water to internal combustion engines, boilers, heating units or gas turbines by application of the apparatus according to claim 1, comprising the steps of:
provinding said mixture of fossil fuel and water into the inlet of the treatment unit,
passing said mixture from said inlet to said outlet,
connecting said electrical current generator to the innermost tube and the outermost tube, and
discharging a treated mixture of fossil fuel and water from the outlet of the treatment unit.

12. A method according to claim 11, further comprising the step of flowing the mixture of fossil fuel and water through the intermediary spaces of the treatment unit from the inlet to the outlet.

13. A method according to claim 12, further comprising the step of exposing said mixture of fossil fuel and water to a pulsed electromagnetic field from the electrical current generator.

14. A combustible treated mixture of fossil fuel and water obtained by the method of claim 11.

* * * * *